July 19, 1960  R. W. MARTIN  2,945,378
LINEAR ACCELEROMETER
Filed Sept. 13, 1957

INVENTOR.
ROBERT W. MARTIN
BY *Elliott & Pastoriza*
ATTORNEYS

United States Patent Office 2,945,378
Patented July 19, 1960

2,945,378

LINEAR ACCELEROMETER

Robert W. Martin, San Fernando, Calif., assignor to Physical Measurements Corporation, a corporation of Delaware Filed Sept. 13, 1957, Ser. No. 683,858

1 Claim. (Cl. 73—497)

This invention relates generally to accelerometers and more particularly to an improved accelerometer construction for indicating accelerations and components of accelerations along a given rectilinear axis.

Conventional accelerometers generally include a sensing mass restrained by a leaf spring or modified type of leaf spring in combination with a suitable position indicating device to provide a measure of acceleration. Usually, the restrained mass is enclosed within a fluid tight casing and a suitable fluid employed for damping movement of the mass. In some instances, dual masses coupled together are employed to eliminate cross talk and thus limit the instrument to measurements of accelerations along a single rectilinear axis. While the provision of dual masses essentially solves the cross talk problem, accelerometers of this type are necessarily more complicated and thus subject to greater maintenance problems as compared to accelerometers employing only a single sensing mass. Another difficulty in present day accelerometers resides in the hysteresis characteristic of the mass restraining springs. This hysteresis effect oftentimes causes inaccurate repositioning of the mass from an accelerated position back to its neutral position. As a consequence, presently available accelerometers do not yield accurate indications of threshold accelerations.

In addition to the above, present day fluid damped accelerometers usually require heaters and the like to compensate for ambient temperature variations. Further, suitable indicating means for detecting the position of the sensing mass often require auxiliary amplifiers and the like in order to provide the desired sensitivity.

Bearing the above in mind, it is a primary object of the present invention to provide an improved linear accelerometer in which the mass restraining means has an extremely small hysteresis characteristic whereby very low threshold accelerations may be accurately indicated.

More particularly, it is an object to provide an accelerometer of the above type incorporating only a single sensing mass in which the mass restraining spring construction, aside from low hysteresis, serves the function of constraining movement of the mass to a single rectilinear axis whereby cross talk is substantially eliminated and any error due to non-linearity in the detecting means is minimized.

Still another object is to provide an improved linear accelerometer incorporating fluid damping which does not require auxiliary heaters and the like for maintaining the damping effect constant over wide temperature ranges to the end that a very rugged and long-lived instrument is provided.

Still another important object is to provide a linear accelerometer including an improved electrical detecting means of increased sensitivity over those heretofore employed whereby auxiliary amplifiers and the like are eliminated.

These and many other objects and advantages of the present invention are attained, briefly, by providing a fluid tight casing having a cylindrical interior filled with a suitable damping fluid. A pair of spaced flexible diaphragms are secured at their peripheries to the interior of the casing and serve to support at their central regions a sensing mass disposed between the diaphragms whereby the mass itself is constrained to movement along an axis normal to the diaphragms and coinciding with the casing axis. The diaphragms themselves include orifices of given cross sectional area for passing portions of the damping fluid from one side of the diaphragms to the other so that proper damping of the mass is achieved.

Compensation for changes in fluid viscosity as a result of temperature changes is attained mechanically by means of an eclipsing disc having a wedge shaped opening in partial registration with the orifice openings. The position of the eclipsing disc in turn is controlled by a thermally responsive element secured within the casing. The effective cross sectional area of the orifice for passing fluid is thus altered in accordance with temperature and consequently viscosity whereby the damping characteristic of the instrument is maintained substantially constant.

The preferred form of indicating means includes a flux carrier which may be attached to or comprise a portion of the sensing mass. Suitable coupling coils are in turn rigidly secured to the interior of the casing and disposed in flux coupling relationship with the flux carrier on the sensing mass. Electrical signals in the coils are thus a function of the position of the sensing mass and serve to provide an extremely sensitive indication of acceleration.

The preferred embodiment of the invention also includes a fluid volume compensating capsule incorporated in the casing which may be vented to the atmosphere exterior to the casing.

A better understanding of the invention will be had by referring to one embodiment thereof as illustrated in the accompanying drawings, in which.

Figure 1:
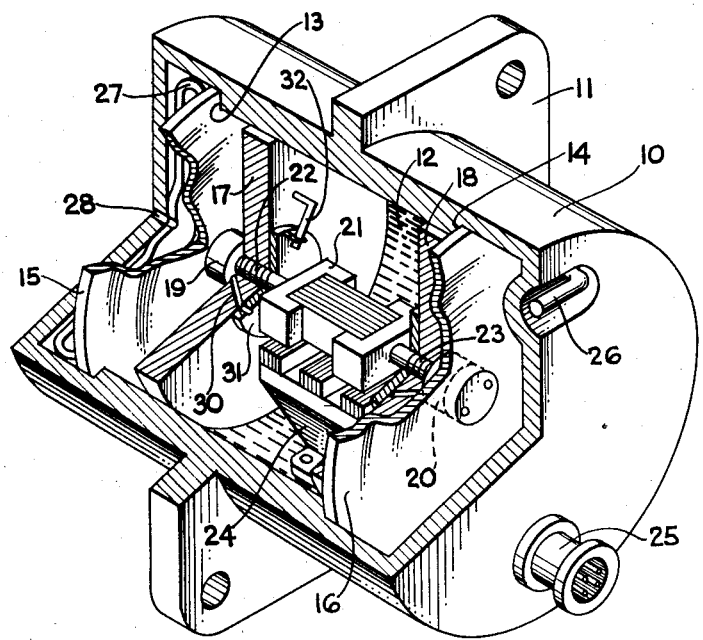
Figure 1 is a cutaway perspective view of one form of the linear accelerometer of this invention.

Referring to Figure 1, there is illustrated a casing 10 provided with a center mounting flange 11 for rigidly securing the casing to a vehicle or other body the acceleration of which is to be measured. The casing 10 has a cylindrical interior including a reduced diameter portion 12 defining annular end shoulders 13 and 14 spaced inwardly from the respective inner ends of the casing 10. These shoulders serve as mounting surfaces for the peripheries of first and second flexible circular shaped diaphragms 15 and 16. Any other type of suitable mounting may, of course, be used.

Disposed within the casing between the diaphragms 15 and 16 is a sensing mass including bell members 17 and 18, respectively, secured to the central opposing portions of the diaphragms 15 and 16 by securing collars 19 and 20. Also included as a portion of the sensing mass is a flux carrier 21 rigidly connected to the bells 17 and 18 as by mounting rods 22 and 23. An E type sensing coil 24 which forms no part of the sensing mass is rigidly secured to the floor of the casing interior and has its coils disposed in flux coupling relationship with the flux carrier 21. The arrangement is such that relative motion of the sensing mass flux carrier portion with respect to the E type coil 24 results in a change in the electrical signals in these coils which change is communicated to suitable exterior indicating means through the outlet receptacle 25.

The exterior of the casing includes a fill tube 26 passing into the interior for filling the interior with a damping fluid. At the opposite end of the casing, as illustrated in Figure 1, there is also provided an expansion capsule 27 which may be vented to the atmosphere as by a small vent opening 28. With the casing filled with fluid 29, the expansion capsule 27 will accommodate fluid volume changes resulting from temperature changes.

In order to provide the desired damping of movement of the sensing mass, small orifices, such as the orifice passage 30, extend through the end bells 17 and 18 and corresponding diaphragms to the opposite sides thereof. Upon movement of the entire sensing mass, fluid will flow from one side of the diaphragm and adjacent end bell to the other in a controlled manner through the orifices.

In order to compensate for changes in fluid viscosity, as a result of temperature changes, a mechanical compensating system comprising an eclipsing disc 31 and thermally responsive actuating strip 32 is mounted over the opening of the orifice passage 30 on the bell member 17. A similar compensating disc is provided on the bell member 18.

The operation of the accelerometer may best be understood by now referring to the elevational views of Figures 2, 3, 4, and 5.

Figure 2:
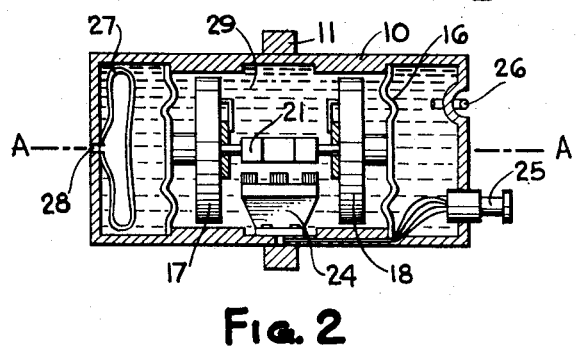
Figure 2 is an elevational view partly in cross section of the accelerometer of Figure 1 illustrating the sensing mass in a neutral position.

In Figure 2 the diaphragms 15 and 16 and sensing mass comprising the bell members 17 and 18 and the flux carrier 21 are shown in a neutral or centered position within the casing 10. The diaphragms themselves are preferably formed of metallic spring material annularly corrugated as indicated so that the center portions thereof may be displaced along an axis normal to the plane of the diaphragms. As a result of the peripheral mounting of these diaphragms, they can only be flexed in a direction normal to their planes and the sensing mass is, therefore, constrained to movement along the central axis A—A of the cylindrical interior of the casing. Accordingly, only components of acceleration in the direction of this central axis will affect the sensing mass.

Figure 3:
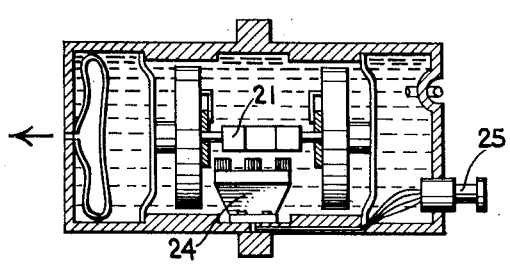
Figure 3 is a view similar to Figure 2 illustrating the position of the sensing mass as a consequence of acceleration of the casing.

Assuming that the casing 10 is subject to an acceleration in the direction of the arrow as indicated in Figure 3, the inertia of the sensing mass will result in a displacement to the right, this displacement being opposed by the resilient diaphragms 15 and 16. Since the mass is constant and the restraining forces exerted by the diaphragms are directly proportional to displacement, the actual displacement of the sensing mass itself will be directly proportional to the acceleration of the casing. This displacement is indicated by the change in the flux coupling of the flux carrier with respect to the E type coupling coils 24 which results in a variation in the signals passed from the coils 24 through the outlet 25. The change in these signals operates a suitable indicating meter (not shown) to provide a direct reading of acceleration.

An extremely important feature of the present invention resides in the use of the circular flexible type diaphragms 15 and 16 for mounting the sensing mass. It has been found that by mounting the sensing mass to the central portions of the diaphragm, the displacement of these diaphragms in a direction normal to their planes provides restoring forces which are extremely linear with respect to the displacement over the entire contemplated range of operation of the instrument. As a consequence, the hysteresis of these diaphragm springs is extremely low enabling very small threshold accelerations to be measured with a high degree of reliability. Further, the constraint of movement of the sensing mass to the central axis as a consequence of the mounting thereof by the diaphragms substantially eliminates any cross talk in the accelerometer. In addition, the air gap between the flux carrier and E coils is maintained constant thus cancelling out non-linearity due to changes in the air gap.

Changes in fluid volume as a result of temperature changes are readily accommodated by the expansion capsule 27 illustrated in Figures 2 and 3. While it is preferable to provide the small vent 28, the capsule may be entirely sealed if desired, the compressibility of the gas therein serving to accommodate volumetric changes in the fluid.

To insure consistent operation over a wide range of temperatures, it is also desirable to compensate for changes in viscosity in the fluid which changes in turn affect the damping of the sensing mass. To this end, rather than employ compensating heaters or controlled temperatures, the eclipsing member 31 and thermally responsive strip 32 described briefly in connection with Figure 1 are employed. The operation of this mechanical compensation will best be understood by referring to Figures 4 and 5.

Figure 4:
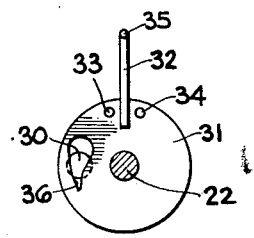
Figure 4 is a schematic illustration of the mechanical fluid viscosity compensating means incorporated in the accelerometer of Figure 1 in a first position; and, Figure 5 is a view of the compensating arrangement of Figure 4 in a second position as a result of fluid viscosity changes resulting from temperature variations.

In Figure 4, the eclipsing disc member 31 is illustrated looking in the direction of the central axis A—A, and as shown, this disc is rotatably mounted on the rod 22. The thermally responsive strip member 32 may comprise a simple bi-metallic strip having a free end disposed between a pair of spaced projecting pins 33 and 34 secured on the front surface of the disc 31 and having its fixed end rigidly secured to the bell member 17 as at 35. The eclipsing member itself includes a wedge shaped opening opening 36 in partial registration with the orifice 30.

Figure 5:
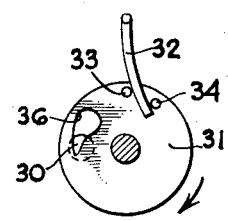

In the position illustrated in Figure 4, the orifice 30 has an intermediate cross sectional area. When the temperature of the fluid increases as a result, for example, of an ambient temperature rise, the bi-metallic control strip 32 will bend as illustrated in Figure 5 thereby bearing against the projection 34 to rotate the eclipsing disc 31 in a clockwise direction as indicated by the arrow. This rotation in turn results in a narrower portion of the wedge shaped opening registering with the orifice opening 30 to result in an effectively decreased cross sectional area for fluid flow therethrough. Since the increased temperature results in a lower viscosity of the damping fluid, the corresponding decreased cross sectional area for accommodating fluid flow from one side of the diaphragm to the other serves to compensate for this viscosity change. As a result, the overall damping characteristic is maintained substantially constant. A decrease in the fluid temperature will cause the bi-metallic strip 32 to move in the other direction thereby bearing against the pin 33 and rotating the eclipsing disc 31 in an opposite direction to increase effectively the cross sectional area of the orifice 30. Fluid flow through the orifice is thus facilitated as the viscosity of the fluid increases. The eclipsing disc on the bell member 18 of Figure 1 operates in an identical manner.

It will be apparent from the above description that the present invention provides a greatly improved linear accelerometer in which accelerations along the A—A axis may be very accurately indicated. While the "E" type pick-up coil is preferable in providing a suitable indication of the position of the sensing mass, other detecting means may, of course, be employed. Such detecting means include capacitive, inductive and potentiometer contact type pick-up devices as well as simple mechanical linkages. Further, while a preferred mechanical apparatus has been illustrated for compensating for viscosity changes, other expedients for effecting the same compensation will readily occur to those skilled in the art.

This invention, accordingly, is not to be thought of as limited to the specific embodiment disclosed for illustrative purposes.

What is claimed is:

An accelerometer comprising, in combination: a casing having a cylindrical interior portion of reduced diameter defining first and second annular shoulders spaced inwardly from opposite ends of the casing; first and second circular flexible diaphragms having their peripheries respectively secured to said annular shoulders; a mass disposed between and having its opposite ends secured to said central portions of said diaphragms so that said mass is restrained by said diaphragms to rectilinear motion along the central axis of said cylindrical interior; damping fluid filling said casing, said diaphragms including orifices for passing portions of said fluid from one side of said diaphragms to the other upon movement of said mass; an eclipsing member having a wedge-shaped opening positioned over and in partial registration with at least one of said orifices; thermally responsive means coupled to said eclipsing member for altering the position of said wedge-shaped opening with respect to said orifice so that the effective cross sectional area of the orifice for passing portions of the fluid is varied in response to viscosity changes in the damping fluid resulting from variable temperatures; a capsule containing a gas disposed between one end of said casing and one of said diaphragms, said capsule having a small vent means therein passing through said casing to place the interior of the capsule in communication with the atmosphere exterior of said casing so that said capsule accommodates changes in the volume of said fluid in the casing; E-type detecting coils secured to said casing within said reduced diameter cylindrical portion between said diaphragms juxtaposed said mass, said mass including an electrical flux carrier positioned directly over said coils when said mass is in a neutral position, whereby changes in signals in said coils are a function of changes in position of said mass.

References Cited in the file of this patent

UNITED STATES PATENTS

| | | |
|---|---|---|
| 1,119,013 | Hapgood | Dec. 1, 1914 |
| 2,004,904 | Peo et al. | June 11, 1935 |
| 2,332,994 | Draper et al. | Oct. 26, 1943 |
| 2,440,605 | Hathaway | Apr. 27, 1948 |
| 2,570,672 | King | May 15, 1951 |
| 2,570,672 | Hathaway | Oct. 9, 1951 |
| 2,671,202 | Petroff | Mar. 2, 1954 |
| 2,689,723 | Von Basel | Sept. 21, 1954 |